(12) United States Patent
Dantrey et al.

(10) Patent No.: US 10,705,790 B2
(45) Date of Patent: Jul. 7, 2020

(54) APPLICATION OF GEOMETRIC ACOUSTICS FOR IMMERSIVE VIRTUAL REALITY (VR)

(71) Applicant: Nvidia Corporation, Santa Clara, CA (US)

(72) Inventors: Ambrish Dantrey, Pune (IN); Anshul Gupta, Pune (IN)

(73) Assignee: NVIDIA CORPORATION, Santa Clara, CA (US)

( * ) Notice: Subject to any disclaimer, the term of this patent is extended or adjusted under 35 U.S.C. 154(b) by 59 days.

(21) Appl. No.: 16/183,396

(22) Filed: Nov. 7, 2018

(65) Prior Publication Data

US 2020/0142665 A1     May 7, 2020

(51) Int. Cl.
*H04L 29/08* (2006.01)
*G06F 1/32* (2019.01)
*G06F 3/16* (2006.01)

(52) U.S. Cl.
CPC .............. *G06F 3/165* (2013.01); *H04L 67/18* (2013.01); *H04L 67/34* (2013.01)

(58) Field of Classification Search
CPC .......... H04L 67/34; H04L 67/18; G06F 3/165
USPC ....................................................... 709/219
See application file for complete search history.

(56) References Cited

U.S. PATENT DOCUMENTS

| | | | |
|---|---|---|---|
| 2008/0008342 A1* | 1/2008 | Sauk | G01C 21/165 381/315 |
| 2013/0202125 A1* | 8/2013 | De Sena | G10K 15/12 381/63 |
| 2017/0223478 A1* | 8/2017 | Jot | H04S 3/002 |

* cited by examiner

*Primary Examiner* — Tu T Nguyen
(74) *Attorney, Agent, or Firm* — Shook, Hardy & Bacon, L.L.P.

(57) ABSTRACT

A virtual reality (VR) audio rendering system and method include spatializing microphone-captured real-world sounds according to a VR setting. In a game streaming system, when a player speaks through a microphone, the voice is processed by geometrical acoustic (GA) simulation configured for a virtual scene, and thereby spatialized audio effects specific to the scene are added. The GA simulation may include generating an impulse response using sound propagation simulation and dynamic HRTF-based listener directivity. When the GA-processed voice of the player is played, the local player or other fellow players can hear it as if the sound travels in the scenery and according to the geometries in the virtual scene. This mechanism can advantageously place the players' chatting in the same virtual world like built-in game audio, thereby advantageously providing enhanced immersive VR experience to users.

20 Claims, 5 Drawing Sheets

ID OF THE INVENTION

Embodiments of the present invention are related to audio data processing, and more specifically, to geometrical acoustic data processing for computer applications, such as virtual reality applications.

BACKGROUND OF THE INVENTION

While virtual reality (VR) opens up exciting opportunities in several areas including content creation, and sports, entertainment and game broadcasting, VR applications also bring new challenges when attempting to deliver immersive experiences to a broad base of users Geometrical Acoustic (GA) processing is the simulation of sound ray propagation in a particular spatial model (e.g., a virtual scene setting in a VR game), which can be executed by a GA processing pipeline for example. Based on geometrical information about the setting, GA processing can automatically determine how the sound waves travel and bounce around the environment and reach a character or another type of object in the setting (e.g., which is subject to control by a player in real-time), thus producing 3D spatialized audio data.

Typically, a GA processing pipeline processes the geometry of a virtual scene along with knowledge of sound sources and receiver location by using a ray tracing algorithm and an audio rendering algorithm. The ray tracing algorithm is used to compute a spatial acoustic model and generate impulse responses (IRs) that encode the delays and attenuation of sound waves traveling from a sound source object to a sound receiver object through different propagation paths representing transmission, reflection, and diffraction. Rays (or sound waves) are traced to generate an impulse response which represents the decay of audio energy in time at the place of the sound receiver. Whenever the sound source, the receiver, or another object in the scene moves, these propagation paths need to be recomputed—sometimes periodically. The audio rendering algorithm is used to generate audio signals by convolving the input audio signals with the IRs. In a virtual environment such as in a game, where the acoustic geometry of the scene is known along with the positions of a sound source and a sound receiver, GA processing is applied to generate spatialized audio data.

There are multiple on-going efforts to have GA audio in computation intensive games to provide an immersive VR experience. But these efforts are restricted to application of GA to only in-game audio, e.g., audio generated by the application program. In existing systems, verbal interaction among multi-players as captured by microphones can be rendered concurrently with the game play. However, the microphone-captured audio can only be rendered in a plain and unprocessed manner and not immersed in, but rather detached from, the virtual scenes. Multiplayer VR applications can be performed by making the interactions of the players and the application more immersive.

SUMMARY OF THE INVENTION

This invention provides a mechanism for incorporating real-life audio captured at users' microphones into in-application audio by applying an in-application Geometrical Acoustic (GA) model to the microphone-captured audio.

The novel solution presents a way to increase the VR immersiveness of players in a multiplayer gaming environment by extending the application of GA processing to microphone data. In one or more embodiments, GA processing includes modeling a simulation of sound ray propagation in a particular setting. GA determines how the sound waves bounce around the environment and reach the user with information about the geometry of the space, thus providing a 3D audio spatialization.

In one or more embodiments, when a user/player of a multi-player content streaming application speaks through a microphone, the voice is processed by simulating the GA properties configured for a virtual scene, and thereby added with spatialized audio effects specific to the scene. When the GA-processed voice is played through a speaker for example, another user can hear it as if the sound traveled according to objects in the scenery and the geometry in the virtual scene. This mechanism can advantageously place the users' conversation in the same virtual world, just like rendered game audio, thereby advantageously providing enhanced immersive VR experience to users.

Embodiments of the present disclosure include convolving microphone-captured audio data with an impulse response (IR) characteristic of a sound channel in a virtual scene to produce audio frames for rendering. More specifically, the IR is generated by using sound propagation simulation and head-related transfer functions (HRTFs) based on positions (including orientations and locations) of the sound source and receiver objects in a particular scene. In some embodiments, a multiplayer gaming system operates in a client/server model, in which multiple game consoles (e.g., one for each player) act as clients with a common server. Each client computer updates GA processing-related information periodically to the server, such as the player's inputs, the player's new head position or motion as sensed by a head mounted display (HMD) as well as the player's voice captured by a microphone. Having received the information, the server performs GA processing to determine the updated positions of all the players, which may translate to new positions of the objects in the virtual scene for example. The server then sends an authoritative version of these positions to all the clients. Also, the microphone-captured audio data is transmitted from the client of the sound's source through the network to all other players. In this manner, each client computer can receive information of the locations as well as audio of all other players in real time.

With the information of other players as well as the geometry, location and direction of the local player, a client computer computes impulse responses (IRs), e.g., using sound propagation simulation and dynamic head-related-transfer function (HRTF)-based listener directivity. According to embodiments of the present disclosure, the IRs are convolved with the real-time microphone-captured data to advantageously produce audio frames for rendering through speakers or headphones associated with the client computer. The IRs can be later recomputed responsive to changes in listener and source locations. As perceived by the local player, another player's voice is advantageously placed accurately in the context of the virtual scene and thus immersed in the virtual reality. That is, players' verbal interactions can be played out with a VR immersive effect as well as the audio data generated by the game or application.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
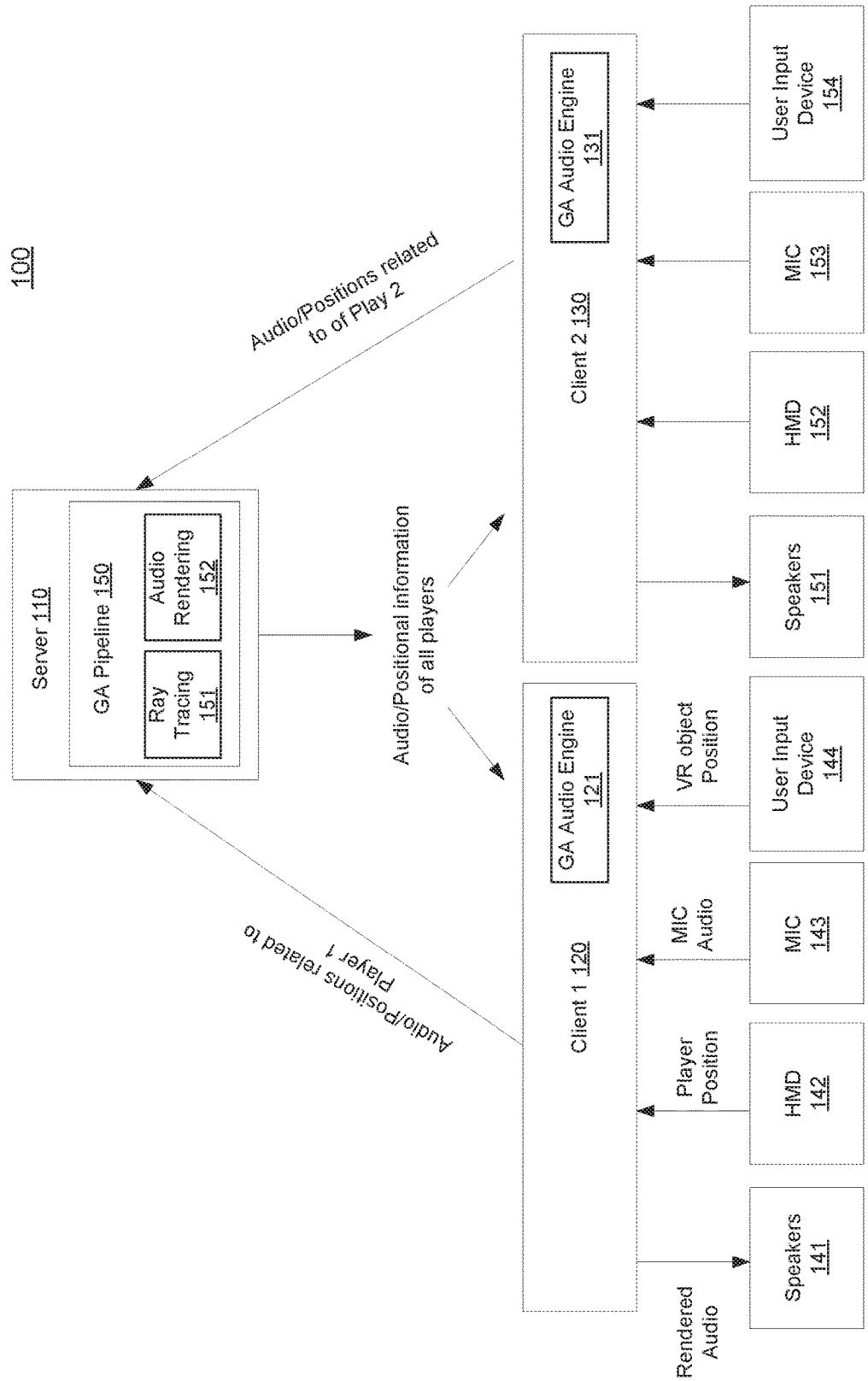
FIG. 1 is a block diagram illustrating an exemplary VR streaming system configured to render microphone-captured audio in an immersive VR setting in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "rendering" or "processing" or "accessing" or "performing" or "executing" or "transforming" or "determining" or the like, refer to the action and processes of an integrated circuit, or similar electronic computing device, that manipulates and transforms data represented as physical (electronic) quantities within the computer system's registers and memories into other data similarly represented as physical quantities within the computer system memories or registers or other such information storage, transmission or display devices.

Application of Geometrical Acoustics on Microphone Data in Multiplayer Games for Immersive Virtual Reality (VR)

In a virtual reality (VR) environment, positional audio cues are very important for producing a spatialized acoustic effect and therefore providing a realistic and immersive virtual reality (VR) experience for a user. Embodiments of the present disclosure include a process to spatialize microphone-captured real-world sound according to a VR setting. In a game, when multiple game characters are positioned in close vicinity of each other within a VR setting, geometric acoustics (GA) modeling is applied to advantageously convert the microphone-captured audio to audio data with an immersive VR effect. With positional cues and geometrical acoustics added to the microphone-captured audio, the players can enjoy enhanced immersive VR experiences during verbal communication from other players.

GA modeling is the simulation of sound ray propagation in a particular spatial setting (e.g., a virtual scene setting), which can be executed by a GA processing pipeline, for example. Based on geometrical information about the VR setting, GA processing determines how the sound waves travel and bounce around the environment to reach a character or an object (e.g., which is controlled by a player in real-time), thus providing 3D spatialized audio data. Head movements of a listener (e.g., a simulated listener object) within a VR setting can also change how audio should be perceived by the listener. One aspect of the invention described here is to generate an impulse response (IR) to dynamically characterize a sound channel for propagating (including transmitting, reflecting, and diffracting etc.) microphone-captured audio and generate audio frames by convolving the IR with the microphone-captured audio. As the sound channel may vary with positions of the sound's source and the sound's recipient, as well as the geometrical settings of the virtual scene, the impulse response can be generated by using sound propagation simulation and dynamic HRTF-based listener directivity.

More specifically, embodiments of the present disclosure provide virtual reality (VR) audio rendering systems and methods, in a multiplayer game system, where multiple client devices periodically send updated positional information and microphone-captured real-world sound to the server. Accordingly, the server performs GA processing to determine the updated positions of the objects in the virtual scene and sends an authoritative version of these positions and microphone-captured audio to all the clients. So each client computer receives information related to the locations as well as audio of all other players in real time. At a particular client computer, based on positional information and audio of the other players, the geometry of the VR scene, and the location and orientation of the local player, the client computer can compute impulse responses (IRs) and convolve the IRs with the real-time microphone-captured data to produce audio frames for rendering.

According to embodiments of the present disclosure, as perceived by the local player, another player's verbal communication is placed in the context of the virtual scene. For example, adding positional cues and geometrical acoustic effects to chat audio enhances the players' experiences as a listener-player is able to infer the location of the speaker-player in the virtual scene based on what he or she hears during verbal interaction. Therefore, player interactions become VR immersive as well as the audio data generated by the game or application.

The present disclosure can be applied in a cloud content streaming system, a client-server content streaming system, an individual game console, system, or any other suitable system that exploits GA simulation to generate spatialized audio data. FIG. 1 is a block diagram illustrating an exemplary VR streaming system 100 configured to render microphone-captured audio in an immersive VR setting in accordance with an embodiment of the present disclosure.

In a simplified form, the VR streaming system 100 includes a server device 110 and a plurality of client devices coupled through one or more networks, e.g., Client 1 (120) and Client 2 (130). A VR game can be executed at the server 110 and video and audio frames are generated and streamed to the remote clients 120 and 130 for rendering. Each client device is coupled to a audio playback system (e.g., speakers 141 or 151), a head-mounted device (HMD, e.g., 152 or 152) wearable on a user's head and capable of sensing the user's head position and motion, a microphone (e.g., 143 or 153), and a controller or other user input device (e.g., 144 or 154) for receiving user input. Each microphone can capture a player's voice and other real-world ambient sounds and send the audio signal to the associated client device and further to the server 110.

Herein, unless otherwise specified, a position or positional information related to a player or a computing device refers to a position and orientation of an object in a VR setting that is subject to control by the player or the device, such as a sound source object, a sound receiver object or another type of object. The object's position in the VR setting may be controlled by a player-user through an input device (e.g., a game controller) and/or the head position of the player with reference to the associated sound system. A change in the position of the object causes a change in the geographic acoustic model. It will be appreciated that the present disclosure is not limited to any specific type of device that can detect and supply positional information and any of a number of well known devices can be used. For example, the positional information may originate from an HMD, a game controller, a keyboard, wearable sensors, etc. In this example, a user's head movements and input to the game controller may change the position of a virtual object and thereby change geometrical acoustic properties of the VR setting.

For example, during operation, each client device (120 or 130) can receive positional update information (including location and orientation information for example) from the associated HMD and the game controller and propagate the information to the server. The server 110 is configured to execute the game application, generate audio and video frames based on the updated position information and render audio on behalf of the clients.

More specifically, the server 110 includes a GA processing pipeline 150 including a ray tracing module 151 and an audio rendering module 152. The ray tracing module 151 can compute a spatial acoustic model and generate IRs that encode the delays and attenuation of sound waves. Sound waves travelling from a sound source object to a sound receiver object travel along a multitude of propagation paths representing different sequences of transmission, reflections, diffractions and refractions at surfaces of the VR environments. Whenever an object in the virtual scene moves, these propagation paths may be recomputed to generate subsequent audio frames for rendering.

The audio rendering module 152 can generate audio frames by convolving the input audio data with the IRs. Rays of sound waves are traced to generate an IR which characterizes the delay of audio energy in the time and place of the sound receiver object. Given the geometry of the VR scene along with the positions of a sound source and a receiver, GA simulation is applied to generate spatialized VR audio frames. The audio processing performed by the GA processing pipeline 150 may use a frame number or timestamp to indicate the time when the processed audio needs to be played out and also to correlate the corresponding position.

According to embodiments of the present disclosure, microphone-captured audio is processed by GA modeling of a virtual setting that is converted to audio data operable to provide a geometrical acoustic effect and positional cues. In the illustrated example, the server GA pipeline 150 is responsible to apply GA modeling to generate audio frames for built-in game audio, while a client audio engine is responsible to apply GA modeling to generate audio frames for microphone-captured real-world audio from the local player or another fellow player. However, in some other embodiments, the server GA pipeline 150 is configured to generate audio frames for microphone-captured audio and then to send the audio frames to a client device for playing.

As shown, the client device 120 has a local GA audio engine 121 capable of computing an impulse response (IR), based on, for example and without limitation, the positional information related to the players and by using sound propagation simulation and dynamic HRTF-based listener directivity. Multiple IRs may be generated for one VR scene, for example one IR can be generated for each combination of an object and its control player. The local GA audio engine 121 then convolves an IR with the corresponding microphone-captured audio to produce audio frames for rendering through a speaker or a headphone associated with the client device 120. The IRs may be recomputed at interactive rates based on changes as detected by the microphones and HMDs.

In some embodiments, a listener-based ray tracing algorithm can be used to generate the IRs. With the listener-based approach, the rays of sound waves are treated as originating from a listener (or a sound receiver), rather than a sound source. Multiple IRs can be generated, one for each player, with a single ray trace run, and the IRs can then be advantageously convolved with respective players' microphone audio.

It will be appreciated that any other suitable geometrical audio processing algorithm or method can be applied to immerse the microphone-captured audio in a VR setting without departing from the scope of the present disclosure.

The positional information related to a player and microphone-captured audio can be collected from a client and transmitted to other peer clients via the server. For example, each client device can send a stream of packets periodically to the server, where each packet contains a simplified update of the player's inputs as received via the game controller, the player's new head position or motion as sensed by a head mounted display (HMD), and the player's voice captured by the microphones. Having received the input packets, the server performs GA simulation to determine the new positions of all relevant objects in the scene, and sends out packets containing an authoritative version of these positions to all the clients. In this manner, each client computer can receive positional information as well as audio data of all other players in real time. However, any other well-known mechanism may be used to communicate positional information and microphone-captured audio among the multiple players in a game without departing from the scope of the present disclosure.

Figure 2:
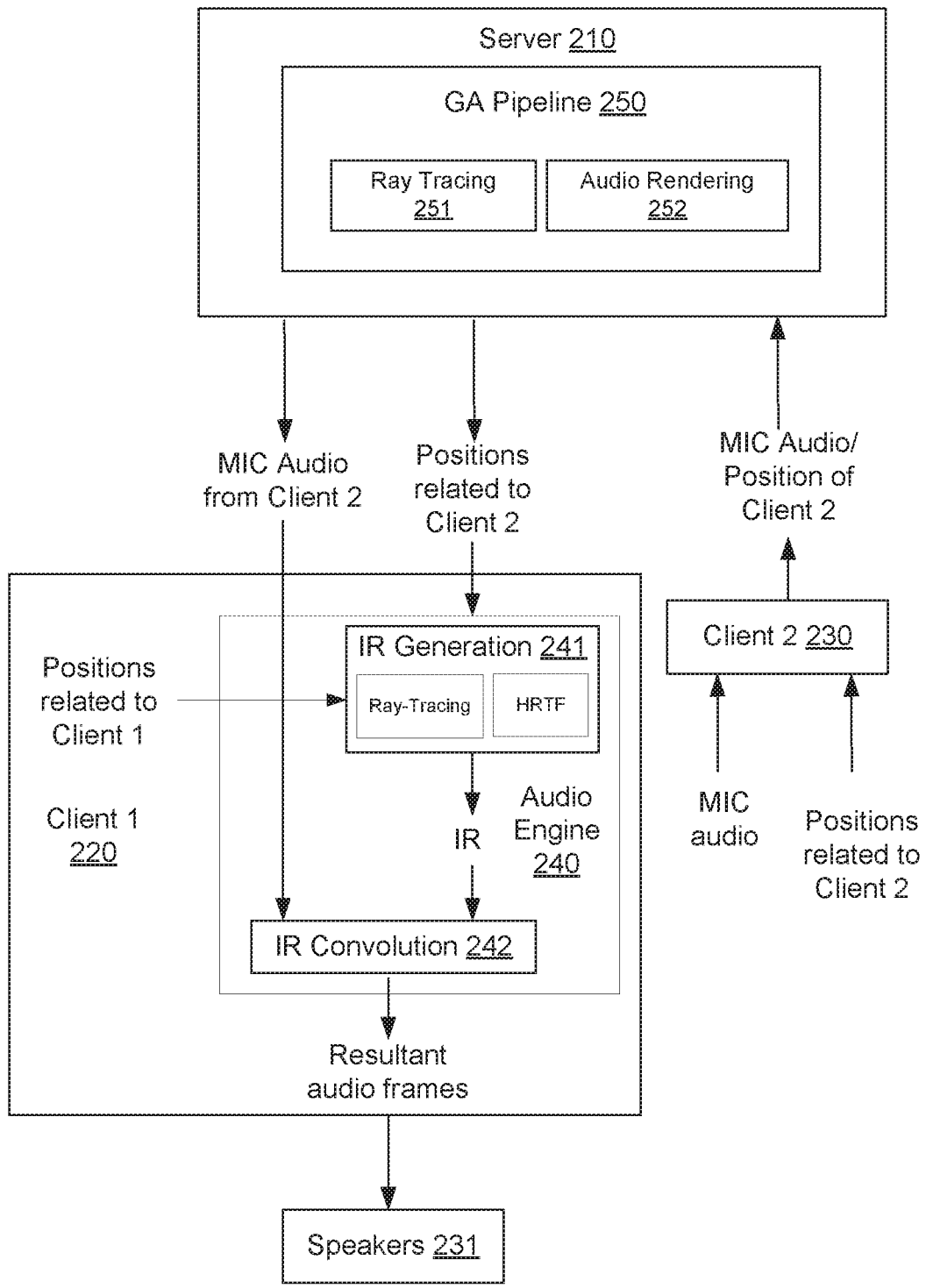
FIG. 2 illustrates the data flow in an exemplary VR system configured to apply GA simulation on microphone-captured audio to generate an immersive VR effect at a client according to an embodiment of the present disclosure.

FIG. 2 illustrates the data flow in an exemplary VR system 200 configured to apply GA simulation at a client to add immersive VR effect to microphone-captured audio according to an embodiment of the present disclosure. The VR system 200 includes a server 210 configured to stream audio and video frames of a VR application to Client 1 (220) and Client 2 (230) through networks in a multiplayer VR game. Client 1 (220) is associated with player 1 and Client 2 (230) is controlled by player 2. According to embodiments of the present disclosure, when a player speaks, his or her voice is captured by a microphone and then processed by embodiments of the present disclosure to add a geometrical acoustic effect. When played by an audio rendering device, the processed verbal communication between players advantageously provide an enhanced immersive VR experience to the players as the listeners can perceive the voice being propagated through the virtual setting of the game. Thus, real-time verbal interactions among the players can advantageously be made more immersive.

For instance, during an instance or session of a game, Client 2 (230) receives positional information related to player 2 from a coupled HDM or a game controller, and receives an audio signal captured by a microphone as illustrated. The microphone-captured audio and positional information (or simplified update thereof) related to Client 2 (230) is transmitted to the server 210 by using a packet. Provided with the input packet, the GA processing pipeline 250 in the server 210 applies GA simulation to determine the new positions related to all the clients in the VR setting (e.g., the subjects or objects controlled by or representing respective clients) and sends out an authoritative version of these positions to all the clients. The microphone-captured data is also transmitted through the network to all other players.

As Client 1 (220) receives the authoritative version of the positional information and the microphone data originating from Client 2 (230), the audio engine 240 in Client 1 (220) generates an IR for a sound channel by using the IR generation module 241. The module 241 utilizes sound propagation simulation and dynamic HRTF-based listener directivity and factors in the new positions of the relevant objects in the sound channel as provided from the server and any new positional information related to player 1 that is locally available at Client 1. For example, the sound channel may encompass a sound source character that acts to voice the microphone-captured audio from player 2, and a sound receiver character that is controlled by player 1, and any other relevant objects that affect the sound propagation to the sound receiver according to the GA model. The locations of these objects in the virtual scene and the orientations of the sound receiver relative to the sound source are germane to sound propagation simulation and listener directivity and therefore are relevant to IR generation.

The IR convolution module 242 in the client audio engine 240 convolves the generated IR with the microphone-captured audio from player 2 to generate resultant audio frames, which can be rendered through the one or more speakers associated with Client 1. As perceived by player 1, geometrical acoustic effects are applied to the voice of player 2 and immersed in the VR setting. For example, by listening to the voice, player 1 may be able to determine if the sound source character controlled by player 2 is coming closer or going away, its (approximate) direction, distance, and whether it is in an open space or partially or wholly enclosed (e.g., in a tunnel), etc. In some embodiments, an audio engine in the Client 2 may apply a similar GA process, including IR generation and IR convolution, such that player 2's audio is rendered with added geometrical acoustic effects and correct positional cues at an audio rendering device that is associated with Client 2. In this way, player 2 can also hear his or her own voice with an enhanced VR experience.

Figure 3:
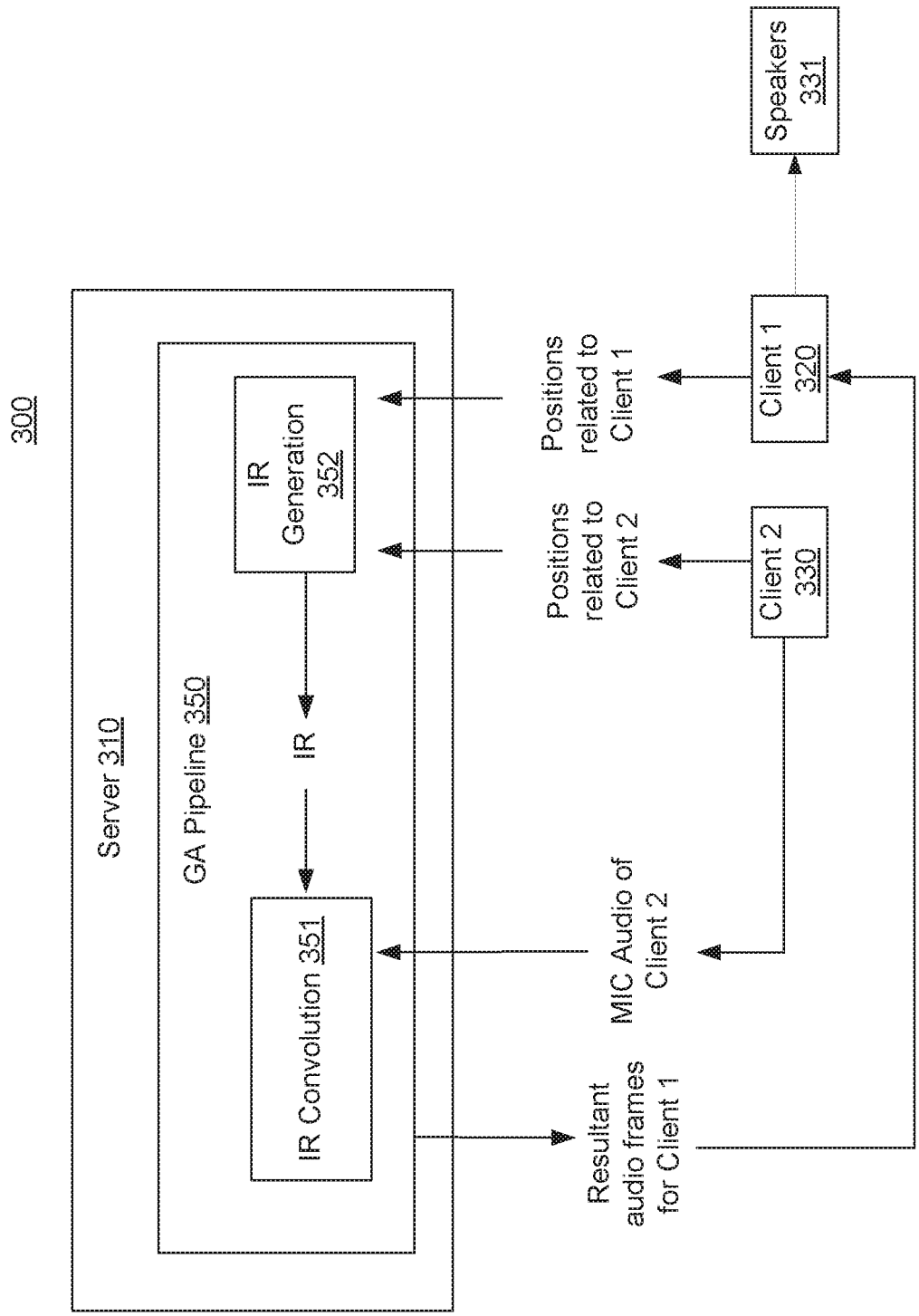
FIG. 3 illustrates the data flow in another exemplary VR system configured to apply GA simulation on microphone-captured audio to generate an immersive VR effect at a server according to an embodiment of the present disclosure.

FIG. 3 illustrates the data flows in another exemplary VR system 300 configured to add immersive VR effects to microphone-captured audio by applying GA simulation at a server according to an embodiment of the present disclosure. The VR system 300 includes a server 310 configured to stream audio and video frames of a VR application to Client 1 (320) and Client 2 (330) through one or more networks in a multiplayer VR application. Client 1 (320) and Client 2 (330) are associated with player 1 and player 2, respectively.

For instance, during the game, Client 2 (330) receives positional information related to player 2 from a coupled HDM or a game controller, and receives an audio signal captured by a microphone, e.g., player 2's verbal communication. The microphone-captured audio and positional information (or simplified update thereof) related to Client 2 (330) and the positional information related to player 1 are transmitted to the server 310, e.g., in packets.

Receiving the input packet, the GA pipeline 350 in the server 310 performs GA simulation to determine the new positions related to all the clients in the VR setting, e.g., the new positions of the various subjects or objects controlled by or representing respective clients. The IR generation module 352 generates an IR of a sound channel for Client 1 (320) by utilizing sound propagation simulation and dynamic HRTF-based listener directivity and factors in the new positions of the relevant objects in the sound channel, or any other suitable processes. For example, the sound channel may encompass a sound source character that acts to voice the microphone-captured audio from player 2, and a sound receiver character that is controlled by player 1, and any other relevant object that affects the sound propagation to the sound receiver according to the GA model.

The IR convolution module 352 convolves the generated IR with the microphone-captured audio from player 2 to generate resultant audio frames for transmission to the clients, including Client 1 (320) and Client 2 (330). Client 1 (320) renders these frames through the one or more associated speakers 331 with Client 1 (320). As a result, the voice of player 2 is immersed in the VR setting as perceived by player 1.

The server may also generate another IR for the character controlled by Client 2 which acts as both the sound source and the sound listener. The IR is then convolved with the microphone audio from Client 2 to produce audio frames for rendering at speakers associated with Client 2 (330) (not shown). In this way, player 2 can hear his or her own voice with an enhanced VR experience.

Figure 4:
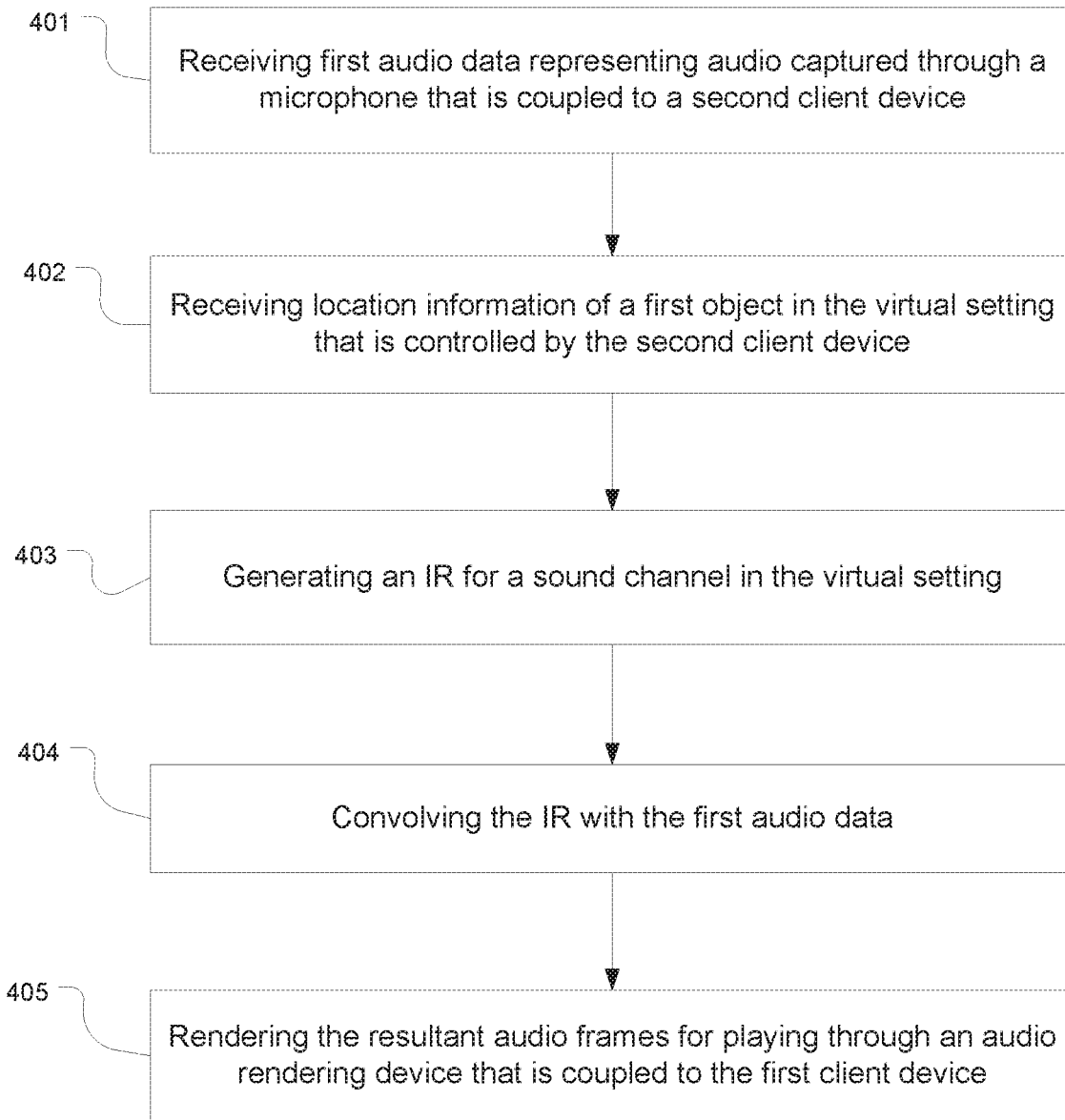
FIG. 4 is a flow chart depicting an exemplary computer implemented process of adding immersive VR effect to microphone-captured audio in accordance with an embodiment of the present disclosure.

FIG. 4 is a flow chart depicting an exemplary computer implemented process 400 of adding immersive VR effect to microphone-captured audio in accordance with an embodiment of the present disclosure. Process 400 may be performed by a client (a first client device in this example) or a server (coupled to a first and a second client devices in this example) or by any other suitable device, as described in greater detail with reference to FIGS. 1-3.

At 401, first audio data that represents microphone-captured audio is received, where the microphone is coupled to the second client device. At 402, the location information of a first object in the virtual setting is received, where the first object is controlled by the second client device. At 403, an IR is generated for a sound channel in the virtual setting. The sound channel includes the first object being a sound source and a second object as the sound receiver which is controlled by the first client device. At 404, the IR is convolved with the first audio data to produce resultant audio frames. Steps 403 and 404 may be performed locally at the first client device as described in greater detail with reference to FIG. 2. Alternatively, steps 403 and 404 may be performed by the server, in which case the resultant audio frames are transmitted from the server to the first client device. In either case, at 405, the resultant audio frames are rendered for playing through an audio rendering device that is coupled to the first client device.

Figure 5:
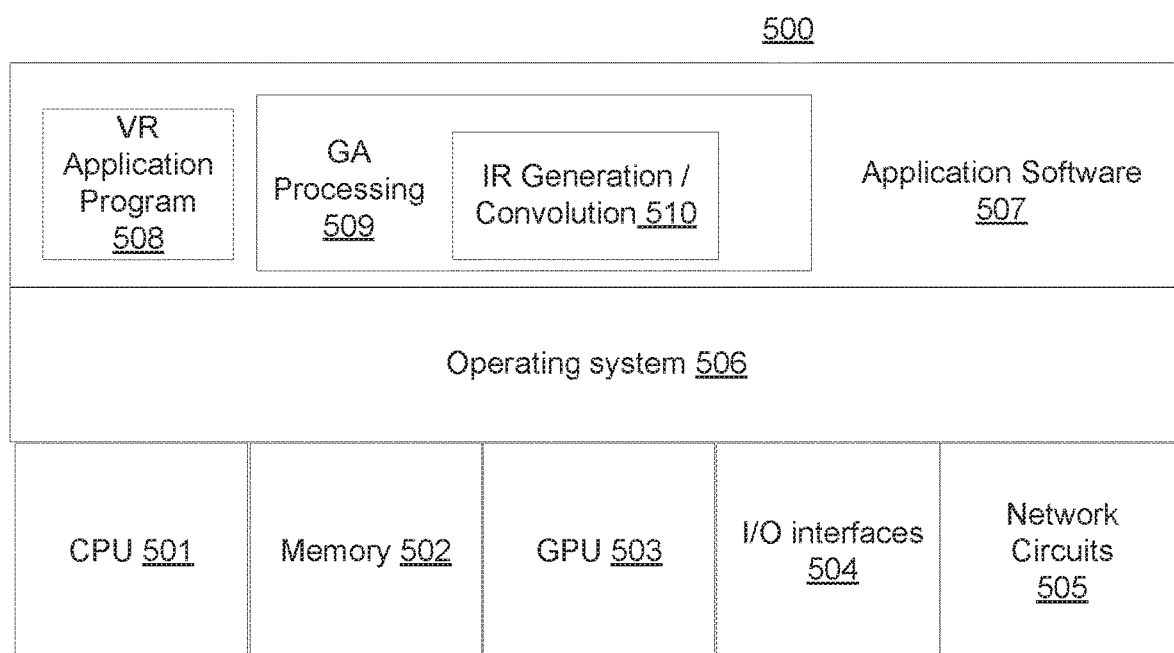
FIG. 5 is a block diagram illustrating an exemplary computing device operable to generate VR immersive audio frames for rendering from microphone-captured audio data in accordance with an embodiment of the present disclosure.

FIG. 5 is a block diagram illustrating an exemplary computing device 500 operable to generate VR immersive audio frames for rendering from microphone-captured audio data in accordance with an embodiment of the present disclosure. The device 500 may be a general-purpose computing device configured as a server or a client in a VR game streaming system. The device 500 comprises a processor 501, a system memory 502, a GPU 503, I/O interfaces 504 and network circuits 505, an operating system 506 and application software 507 (including, for example, a VR application program 508 and a GA processing program 509 with an IR module 510 for IR generation and convolution) stored in the memory 502. The device can be coupled to peripheral devices such as an HDM, a game controller, speakers and/or head phone. The device may also be coupled to one or more remote computing devices through a communication network, e.g., a server device and/or client devices.

When receiving the input including microphone-captured data and the related positional information (e.g., as provided from a remotely-coupled client or server) and executed by the CPU 501, the GA processing program 509 can perform GA simulation to generate an IR and convolve the IR with the data to generate audio frames for rendering at an audio rendering device. The IR is characteristic of a sound channel in the VR setting, including a sound source object that voices the microphone-captured audio and a sound listener thereof. The VR application program 508 and the GA processing program 509 may perform various other functions that are well known in the art as well as those discussed in details with reference to FIGS. 1-4.

As will be appreciated by those with ordinary skill in the art, the GA processing program and the IR module 510 in FIG. 5 can be implemented in any one or more suitable programming languages that are well known to those skilled in the art, such as C, C++, Java, Python, Perl, C #, SQL, etc.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented method of rendering audio associated with a virtual reality application program, the method comprising:
   receiving, during an execution of said virtual reality application program, first audio data transmitted through a communication network and representing a first audio signal captured at a first microphone;
   applying a geometrical acoustic model representative of a virtual environment to said first audio data to generate resultant audio data, wherein said applying comprises:
      generating an impulse response based on said geometrical model and a location of a first object in said virtual environment; and
      convolving said impulse response with said first audio data; and
   transmitting said resultant audio data to an audio rendering device.

2. The computer implemented method of claim 1, wherein, during said execution of said virtual reality application program:
   said first microphone is communicatively coupled to a first client device;
   said audio rendering device is communicatively coupled to a second client device;
   said first object is controlled by a first user of said first client device and is configured as a sound source object of said resultant audio data; and
   said first client device and said second client device are communicatively coupled to a server device via said communication network.

3. The computer implemented method of claim 2 further comprising receiving, by said second client device, said location of said first object in said virtual environment as provided from said server device.

4. The computer implemented method of claim 3 further comprising, at said second client device:
   receiving updated positional information of a player associated with said second client device; and
   sending a location of a second object in said virtual environment to said server device,
   wherein said updated positional information is detected by a head-mounted device,
   wherein said second object is controlled by said second client device, and
   wherein further said generating said impulse response is further based on said updated positional information and said location of said second object.

5. The computer implemented method of claim 2, wherein said generating said impulse response comprises processing a listener-based ray-tracing algorithm, and wherein further said second client device controls a second object as a sound listener object.

6. The computer implemented method of claim 5, wherein said generating said impulse response further comprises performing sound propagation simulations and applying dynamic head-related transfer function (HRTF)-based listener directivity.

7. The computer implemented method of claim 2 further comprising, at said second client device:
   transmitting second audio data representing a second audio signal captured by a second microphone associated with said second client device to said server device; and further applying said geometrical acoustic model to said second audio data to generate said resultant audio data, wherein said second microphone is communicatively coupled to said second client device during said execution of said virtual reality application program.

8. The computer implemented method of claim 1, wherein said virtual reality application program comprises a multiplayer game executed on a plurality of client devices comprising said first and said second client devices.

9. A computer implemented method of rendering audio during execution of a virtual reality computer game, the method comprising:
receiving first audio data representing a first audio signal captured at a first microphone coupled to a first computer device, the first audio data being received by a second computer device;
at said second computer device, applying a geometrical acoustic model of a virtual environment to said first audio data to generate resultant audio data, wherein said applying comprises:
generating an impulse response based on said geometrical model and a location of a first object in said virtual environment, wherein said first object is controlled by said first computer device; and
convolving said impulse response with said first audio data; and
rendering said resultant audio data at an audio rendering device that is coupled to said second computer device, wherein said first computer device and said second computer device are controlled by different players of said virtual reality computer game.

10. The computer implemented method of claim 9 further comprising receiving, by said second computer device, said location of said first object provided from a server device communicatively coupled to said first computer device and said second computer device.

11. The computer implemented method of claim 9 further comprising, at said second computer device:
receiving updated positional information of a player associated with said second computer device; and
determining a location of a second object in said virtual environment based on a user input to said second computer device, wherein said generating said impulse response is further based on said updated location information and said location of said second object.

12. The computer implemented method of claim 11, wherein said generating said impulse response comprises computing a listener-based ray-tracing algorithm, and wherein further said second object is a sound perceptor with respect to said resultant audio data.

13. The computer implemented method of claim 12, wherein said generating said impulse response further comprises performing sound propagation simulations and applying dynamic head-related transfer function (HRTF)-based listener directivity.

14. The computer implemented method of claim 9 further comprising, at said second computer device:
generating second audio data represent a second audio signal captured by a second microphone that is coupled to said second computer device during said execution of said virtual reality application program; and further applying said geometrical acoustic model to said second audio data to generate said resultant audio data.

15. An apparatus comprising:
a processor;
one or more network circuits; and
a memory coupled to said processor and storing instructions that, when executed by said processor, causes said processor to perform a method comprising:
receiving first audio data transmitted through a network and representing a first audio signal captured at a first microphone;
applying a geometrical acoustic model of a virtual environment to said first audio data to generate resultant audio data, wherein said applying comprises:
generating an impulse response based on said geometrical model and a location of a first object in said virtual environment; and
convolving said impulse response with said first audio data; and
rendering said resultant audio data at an audio rendering device that is coupled to said apparatus.

16. The apparatus of claim 15, wherein, during said execution of said virtual reality application program:
said first microphone is communicatively coupled to a first client device;
said first object is controlled by said first client device and is a sound source of said resultant audio data; and
said first client device and said apparatus are configured as clients communicatively coupled to a server via said communication network.

17. The apparatus of claim 16, wherein said method further comprises receiving said location of said first object provided from said server.

18. The apparatus of claim 17, wherein said method further comprises:
receiving updated positional information of a player associated with said second client device; and
sending a location of a second object in said virtual environment to said server, wherein said updated positional information is detected by a head-mounted device, wherein said second object is controlled by said apparatus, and wherein further said generating said impulse response is based on said updated location information and said location of said second object.

19. The apparatus of claim 16, wherein said generating said impulse response comprises computing a listener-based ray-tracing algorithm and dynamic head-related transfer function (HRTF)-based listener directivity, and wherein further said apparatus controls a second object as a sound perceptor in said virtual environment.

20. The apparatus of claim 16, wherein said method further comprises,
transmitting second audio data represent a second audio signal captured by a second microphone associated with said apparatus to said server; and
further applying said geometrical acoustic model to said second audio data to generate said resultant audio data, wherein said second microphone is communicatively coupled to said apparatus during said execution of said virtual reality application program.

* * * * *